W. TOEPFER.
Beer-Cooler.

No. 163,421. Patented May 18, 1875.

WITNESSES:
A. W. Almqvist
A. F. Terry

INVENTOR:
W. Toepfer
BY
ATTORNEYS.

UNITED STATES PATENT OFFICE

WENZEL TOEPFER, OF MILWAUKEE, WISCONSIN.

IMPROVEMENT IN BEER-COOLERS.

Specification forming part of Letters Patent No. 163,421, dated May 18, 1875; application filed March 20, 1875.

*To all whom it may concern:*

Be it known that I, WENZEL TOEPFER, of Milwaukee, in the county of Milwaukee and State of Wisconsin, have invented a new and Improved Beer-Cooler, of which the following is a specification:

My invention consists of a fan having a hollow and perforated shaft with pipe-connections at the ends for receiving cold air from other fans or blowers arranged over the vat containing the beer on trucks, which are caused, by suitable machinery, to reciprocate the fan and rotate it at the same time, so as to agitate the beer and cool it by the air delivered from the shaft. My invention also comprises a bent tube mounted on the trucks, with pipe-connections for conducting cold water through the beer as a further means of cooling it, the pipe being contrived to move along in the beer or over it. My invention also comprises a mode of fastening the bottom sheets of the vat together by key-clamps and a couple of strips of metal fastened together, between which the edges of the bottom plates are wedged by the clamps.

Figure 1:
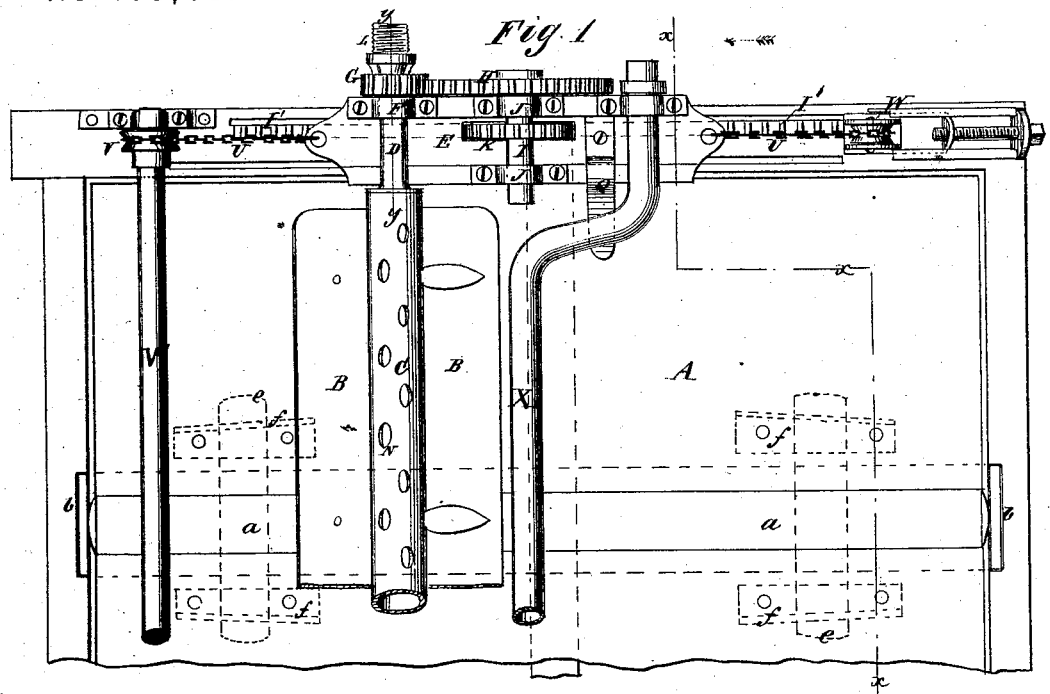
Figure 2:
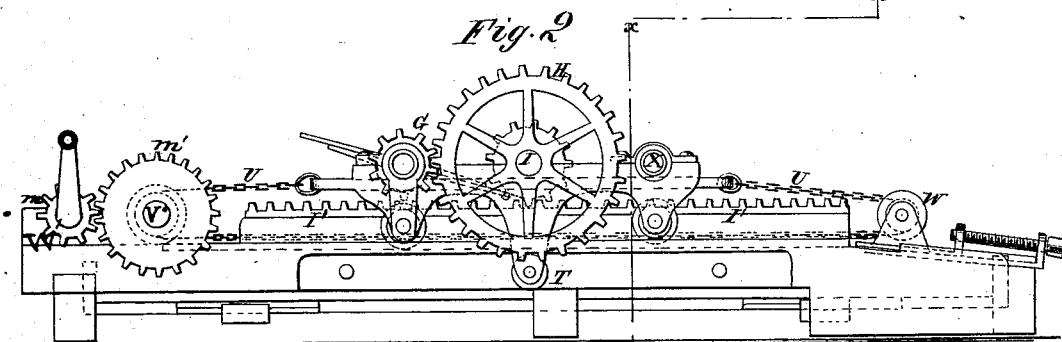
Figure 3:
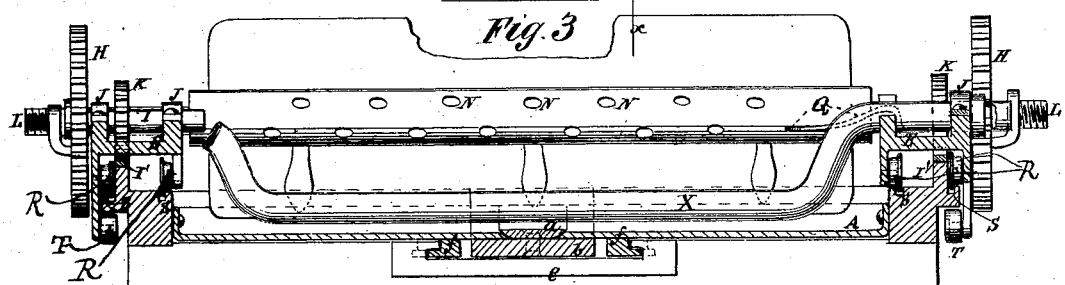
Figure 4:
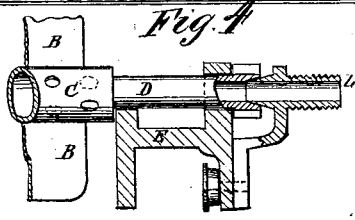

Figure 1 is a plan view of my improved beer-cooler, one side thereof being cut away. Fig. 2 is a side elevation. Fig. 3 is a transverse section on the line $x\,x$ of Fig. 1; and Fig. 4 is a detail section on the line $y\,y$.

Similar letters of reference indicate corresponding parts.

A represents the cooling-vat, over whose entire width I have a fan, B C, the said fan having its shaft C hollow and its blades B radiating at right angles from the same, and set parallel with its length equidistant from each other. To each end of the aforesaid hollow shaft I have a cast-metal hollow head, D, bolted, the outer end of which is reduced in thickness, and bears in a journal-box, F, which is secured to the truck-platform E. To the end projecting through the said box there is a pinion-wheel, G, attached, which meshes in the gear-wheel H on the shaft I, said shaft having its bearings in boxes J J on the truck. K is a gear-wheel set on the shaft I, and which meshes in a rack or toothed rail, I′, extending the length of the cooling-vat. L is a nipple with hose-coupling, which enters the end of the head D. These hose-nipples are to be connected with a pressure-blower or an air-pump in the ice-house. The cold air thus being forced into the hollow shaft C will pass out through the perforations N in the said shaft between the fans B, and thereby serve to cool the beer, which is kept in constant motion by the fan-blades, as they are rotated in moving backward and forward along the vat. X is a flue or pipe for conducting ice-water through the beer in hot weather as a further means of cooling it quickly. The said flue may, if desired, be raised over the surface of the beer and placed on a rest, Q, being arranged in bearings for that purpose.

Each of the trucks is carried on four flanged wheels, R, bearing on rails S. The wheels T in the center of the trucks beneath the outside rail serve to keep the gear-wheels K from springing out of their connection with the toothed rail.

The truck is reciprocated by means of chains U U, which pass over wheels or fast pulleys V on the driving-shaft V′, and over idle wheels W, having fixed bearings on the opposite side of the frame.

The power may be communicated directly to the driving-shaft by any suitable means, but as the present means I illustrate a short crank-shaft, W, which is geared with a shaft, V′, by means of pinion $m$ and spur-wheel $m'$, Fig. 2.

$a$ represents the bottom strip and $b$ the upper one for fastening the plates of the bottom of the vat together by wedging the edges between them in the manner shown in Fig. 3; and $e$ is a clamping piece, to be driven onto the kegs $f$, which are attached to the bottom plates to be fastened together.

Having thus described my invention, I claim as new and desire to secure by Letters Patent—

1. The combination, with the beer-holding vat, of a fan having a hollow perforated shaft and pipe-connections for receiving cold air, and also of contrivances for reciprocating and revolving the fan over the beer, substantially in the manner described.

2. The reciprocating trucks E, hollow and perforated fan and the hollow water-conductor X, combined with a beer-vat, substantially in the manner described.

3. The combination of the strips $a\ b$, clamp $e$, and keys $f$ with the bottom plates $a\ b$, secured together by bolts, in the manner described, for fastening them together.

WENZEL TOEPFER.

Witnesses:
C. W. MILBRATH,
JULIUS E. ROEHR.